(12) United States Patent
Albsmeier

(10) Patent No.: US 9,369,075 B2
(45) Date of Patent: *Jun. 14, 2016

(54) RESONANT COMMUTATION SYSTEM FOR EXCITING A THREE-PHASE ALTERNATOR

(71) Applicant: Kohler Co., Kohler, WI (US)

(72) Inventor: Eric D. Albsmeier, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 41 days.

This patent is subject to a terminal disclaimer.

(21) Appl. No.: 14/286,031

(22) Filed: May 23, 2014

(65) Prior Publication Data
US 2014/0253053 A1  Sep. 11, 2014

Related U.S. Application Data

(63) Continuation of application No. 12/969,759, filed on Dec. 16, 2010, now Pat. No. 8,773,080.

(51) Int. Cl.
| H02P 9/00 | (2006.01) |
| H02P 9/02 | (2006.01) |
| H02P 9/04 | (2006.01) |
| H02P 9/30 | (2006.01) |

(52) U.S. Cl.
CPC .. *H02P 9/02* (2013.01); *H02P 9/04* (2013.01); *H02P 9/302* (2013.01)

(58) Field of Classification Search
CPC ............. H02P 9/02; H02P 9/04; H02P 9/302; H02P 9/305
See application file for complete search history.

(56) References Cited

U.S. PATENT DOCUMENTS

| 3,984,754 A | 10/1976 | Lapaev et al. |
| 4,143,280 A | 3/1979 | Kuehn, Jr. et al. |
| 4,152,636 A | 5/1979 | Gorden |
| 4,453,120 A * | 6/1984 | Bauer ....................... H02P 9/36 322/28 |
| 4,486,801 A | 12/1984 | Jackovich et al. |
| 4,559,487 A | 12/1985 | Sims et al. |
| 4,723,106 A | 2/1988 | Gibbs et al. |
| 4,764,838 A | 8/1988 | MacFarlane |
| 5,153,498 A | 10/1992 | Parro |

(Continued)

OTHER PUBLICATIONS

PCT/US2012/021454 International Search Report and Written Opinion dated May 23, 2012 (5 pages).

(Continued)

*Primary Examiner* — Tulsidas C Patel
*Assistant Examiner* — S. Mikailoff
(74) *Attorney, Agent, or Firm* — Michael Best & Friedrich LLP

(57) ABSTRACT

An alternator has a field coil that produces a magnetic field which induces electricity in a coil arrangement. A field coil excitation system includes a generator with an output coil assembly for producing alternating electricity. A rectifier converts the alternating electricity into voltage and direct current at two nodes. A capacitor, between the nodes, has capacitance that forms a resonant circuit with inductance of the output coil assembly. Due to that resonant circuit, the voltage and direct current oscillate in a predefined phase relationship. A switch and the field coil are connected in series between the nodes. A controller renders the switch conductive for a time period specified by a received control signal. The switch is rendered non-conductive at the first occurrence of a minimum current level after the time period ends. The predefined phase relationship enables the minimum current level to be detected by sensing the voltage.

11 Claims, 2 Drawing Sheets

(56) References Cited

U.S. PATENT DOCUMENTS

| | | | |
|---|---|---|---|
| 5,285,147 A | 2/1994 | Rashid | |
| 5,294,879 A | 3/1994 | Freeman et al. | |
| 5,594,322 A | 1/1997 | Rozman et al. | |
| 6,051,959 A * | 4/2000 | Tupper | H02P 9/305 322/78 |
| 6,081,084 A | 6/2000 | Crecelius | |
| 6,380,718 B1 | 4/2002 | Davis, Jr. et al. | |
| 6,661,206 B2 * | 12/2003 | Gallegos-Lopez | H02P 9/40 322/10 |
| 6,731,098 B1 | 5/2004 | Hintz et al. | |
| 6,998,726 B2 * | 2/2006 | Sarlioglu | F02N 11/0859 290/31 |
| 7,095,204 B2 | 8/2006 | Lee et al. | |
| 7,224,144 B2 | 5/2007 | Inokuchi et al. | |
| 7,327,123 B2 | 2/2008 | Faberman et al. | |
| 7,541,685 B2 * | 6/2009 | Ooiwa | H02P 9/48 290/31 |
| 7,564,224 B2 | 7/2009 | Aoyama | |
| 7,592,785 B2 | 9/2009 | Kimura et al. | |
| 7,649,329 B2 | 1/2010 | Cheng | |
| 8,058,851 B2 * | 11/2011 | Petkov | H02P 9/102 322/44 |
| 8,294,429 B2 * | 10/2012 | Fuller | H02P 9/305 290/40 B |
| 8,541,989 B2 * | 9/2013 | Urakabe | H02M 3/158 322/19 |
| 2002/0030470 A1 * | 3/2002 | Takahashi | H02J 7/1446 322/28 |
| 2003/0137149 A1 * | 7/2003 | Northrup | F03D 9/002 290/44 |
| 2007/0029978 A1 | 2/2007 | Renehan et al. | |
| 2007/0182382 A1 * | 8/2007 | Aoyama | H02P 9/305 322/28 |
| 2007/0210763 A1 | 9/2007 | Aoyama | |
| 2008/0136257 A1 * | 6/2008 | Flanigan | F02B 63/04 307/10.1 |
| 2008/0252238 A1 | 10/2008 | Otaguro | |
| 2009/0045784 A1 * | 2/2009 | Xu | F02N 11/04 322/59 |
| 2009/0167256 A1 | 7/2009 | Maddali et al. | |
| 2009/0218991 A1 | 9/2009 | Eaton et al. | |
| 2009/0322290 A1 | 12/2009 | Shah | |
| 2010/0289459 A1 * | 11/2010 | Kihara | H02J 7/1492 322/7 |
| 2011/0181250 A1 * | 7/2011 | Urakabe | H02M 3/158 322/23 |
| 2014/0266076 A1 * | 9/2014 | Rozman | H02P 9/02 322/24 |
| 2014/0266079 A1 * | 9/2014 | Rozman | H02P 9/02 322/28 |
| 2014/0266080 A1 * | 9/2014 | Silander | H02P 9/302 322/59 |
| 2015/0315989 A1 * | 11/2015 | Andrejak | H02P 9/04 123/350 |
| 2015/0333679 A1 * | 11/2015 | Box | H02P 9/302 310/68 D |

OTHER PUBLICATIONS

United States Patent Office Action for U.S. Appl. No. 12/969,759 dated Mar. 29, 2013 (13 pages).

United States Patent Office Notice of Allowance for U.S. Appl. No. 12/969,759 dated Feb. 25, 2014 (8 pages).

Office Action from the State Intellectual Property Office of the People's Republic of China for Application No. 201280000011.9 dated Mar. 31, 2015 (10 pages).

* cited by examiner

RESONANT COMMUTATION SYSTEM FOR EXCITING A THREE-PHASE ALTERNATOR

CROSS-REFERENCE TO RELATED APPLICATIONS

The present application is related to U.S. patent application Ser. No. 12/969,759, filed Dec. 16, 2010, the entire contents of which is hereby incorporated by reference.

STATEMENT REGARDING FEDERALLY SPONSORED RESEARCH OR DEVELOPMENT

Not Applicable

BACKGROUND OF THE INVENTION

1. Field of the Invention

The present invention relates to circuits and methods for exciting a field coil of an electrical generator.

2. Description of the Related Art

Homes and commercial buildings commonly have an electrical backup generator system" in which an internal combustion engine drives an electrical alternator that provides electricity when power is unavailable from an electric utility company. A controller responds to the interruption of the utility company power by automatically starting the engine. When the alternator reaches operating speed, the controller activates an automatic transfer switch to disconnect selected electrical circuits within the building from the utility power lines and connect those circuits to the output of the alternator. When the controller senses restoration of the utility company power, the automatic transfer switch is operated to reconnect the building electrical circuits to the utility company lines and thereafter stop the engine.

The alternator has a rotor with a field coil that produces a magnetic field which rotates with the rotor. The rotating magnetic field induces current in three stator windings to produce three phases of output current from the alternator. The field coil is energized by an exciter that supplies DC power which is effective to produce the magnetic field.

The DC power can be supplied to the field coil in several ways. One technique involves transferring the DC power from a stationary element to a rotating element on the rotor. This may be accomplished by feeding the DC power from the stationary element to brushes that contact slip rings on the rotor. Another technique is conventionally known as a "brushless exciter." In one version, a DC current is applied to a stationary exciter winding that results in creation of an excitation magnetic field. One or more excitation windings on the rotor pass through this excitation magnetic field, thereby inducing alternating current in the excitation windings. The alternating current is rectified on the rotor to produce the required DC excitation current for the rotor field coil.

The output voltage produced by the alternator typically is regulated to a constant magnitude by selectively varying the DC supply current applied to the brushes or the stationary exciter winding. The alternator output voltage is sensed and any deviation from the desired magnitude is indicated by an error signal. A regulator circuit responds to the error signal by altering the DC supply current until the error signal indicates the desired output voltage is being produced.

Another technique for supplying DC power to the field coil employs a permanent magnet generator. A stationary permanent magnet assembly produces an excitation magnetic field. Excitation windings on are rotated through the excitation magnetic field thereby inducing an alternating current in the excitation windings. The alternating current is rectified on the rotor to produce the required DC excitation current for the rotor field coil. Because the excitation magnetic field is provided by a permanent magnet assembly, regulation of the alternator output voltage cannot be accomplished by controlling the excitation magnetic field. Instead, the application of power from the excitation windings on the rotor to the field coil has to be controlled to regulate the alternator output voltage.

SUMMARY OF THE INVENTION

An alternator has a field coil which is excited by an electric current to produce a magnetic field that induces electricity in an alternator output coil assembly. A system for exciting a field coil comprises a generator having an excitation output coil assembly for producing alternating electricity. A rectifier connected to the excitation output coil assembly converts the alternating electricity into a voltage and a direct current at a pair of output nodes. A capacitor is connected between the pair of output nodes and has a capacitance that forms a resonant circuit with the inductance of the excitation output coil assembly. As a result of that resonant circuit, the voltage and the direct current vary, for example the voltage and direct current oscillate. A minimum current detector is operably connected to determine when the magnitude of the direct current is at a minimum level and an indication of that event is produced.

A switch is connected in series with the field coil to form a circuit branch that is coupled between the output nodes. A controller responds to an excitation control signal by placing the switch in a conductive state and responds to the indication by placing the switch in a non-conductive state.

In one aspect of the present system, the excitation control signal designates a duty cycle for the switch. The controller responds by holding the switch the conductive state for a period of time and, thereafter upon the first occurrence of the direct current having the minimum level, places the switch into the non-conductive state.

In another aspect of the present system, the resonant circuit causes the voltage to have a predefined phase relationship to the direct current. For example, the voltage may lead the direct current by 90 degrees. In this case, the minimum current detector senses the voltage to determine when a minimum current condition occurs. A particular technique and circuit for making that determination are disclosed.

DETAILED DESCRIPTION OF THE INVENTION

Figure 1:
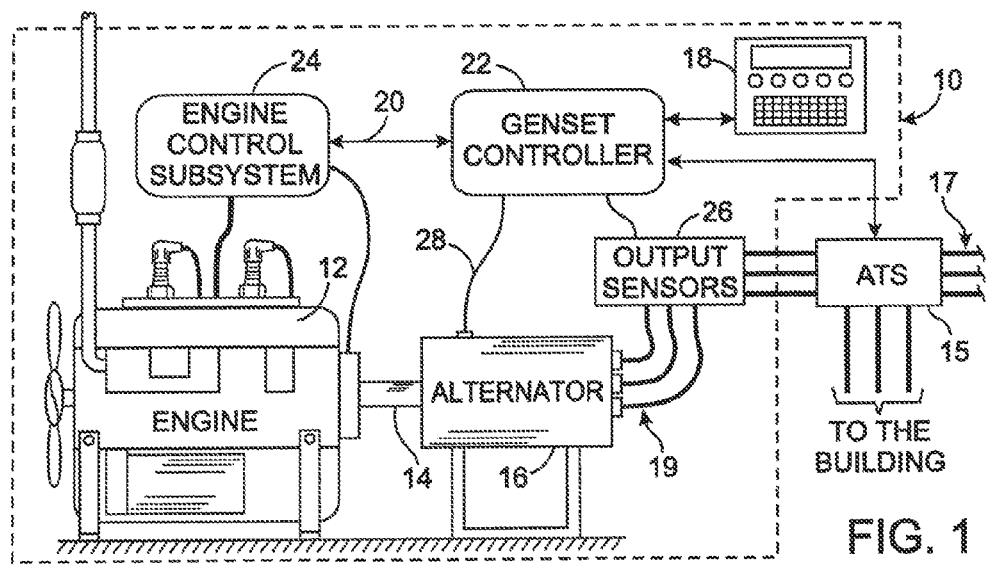
FIG. 1 is a block diagram showing an exemplary engine-generator set that has an alternator which incorporates the present invention.

With initial reference to FIG. 1, an engine-generator set (genset) 10 comprises an prime mover, such as an internal combustion engine 12, coupled by a shaft 14 to an electrical alternator 16. This engine-generator set 10 is commonly used to provide back-up electrical power to a building in the event that power from an electric utility company is interrupted.

Such interruption is automatically sensed by an automatic transfer switch (ATS) 15 that is connected to the utility lines 17 and to the outputs 19 of the alternator 16. When the automatic transfer switch 15 detects that the utility power is unavailable, a signal indicating that event is sent to the engine-generator set 10. In response to that signal, the engine 12 is started to drive the electrical alternator 16. After the alternator begins producing the nominal voltage level (e.g. 220 volts), the automatic transfer switch 15 disconnects the building's electrical wiring from the utility lines 17 and connects that wiring to the output of the alternator.

Specifically, the utility power interruption signal from the automatic transfer switch 15 is received by a genset controller 22 that responds by sending a start command via a communication bus 20 to an engine control subsystem 24. The communication bus 20 may conform to the Computer Area Network (CAN) J-1939 standard promulgated by SAE International, however, other communication bus protocols may be used. The genset controller 22 and the engine control subsystem 24 respectively control operation of the alternator 16 and the internal combustion engine 12.

The genset controller 22 is a microcomputer based subsystem that executes a control program which governs the operation of the alternator to ensure that a constant output voltage is produced. An example of such a genset controller is described in U.S. Pat. No. 6,555,929, which description is incorporated by reference herein. In addition to receiving input signals from the automatic transfer switch 15, the genset controller 22 receives signals from an operator control panel 18 and output sensors 26 that sense the voltage and current levels of the electricity produced by the alternator 16. The genset controller 22 determines whether and by how much the sensed voltage level deviates from the nominal voltage level. The amount of such deviation, if any, is employed to vary a control signal produced on line 28 by the genset controller 22 to control excitation of a magnetic field in the alternator.

Figure 2:
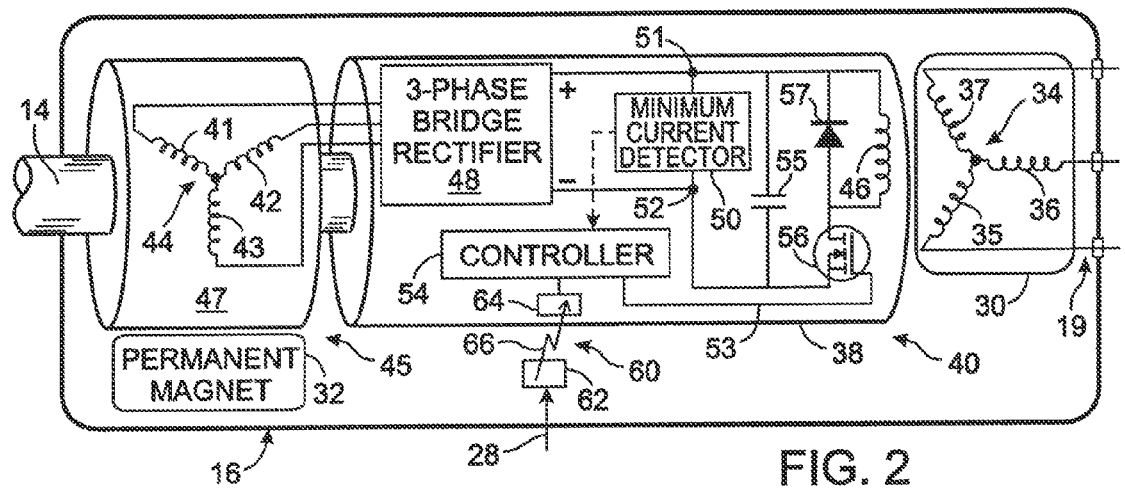
FIG. 2 is a block diagram of the alternator.

With reference to FIG. 2, the alternator 16 has rotor 38 and an exciter armature 47 attached to the shaft 14 that is driven by the internal combustion engine 12. The rotor 38 revolves within a conventional stator 30 on which an alternator output coil assembly 34 is wound. The alternator output coil assembly 34 comprises a conventional arrangement of three output windings 35, 36, and 37 oriented to produce three phases of alternating electric current at the output 19 of the alternator, as will be described.

Mounted on the rotor 38 is an exciter 40 which produces a direct current that is applied to a field coil 46 located proximate to the alternator output coil assembly 34. The exciter 40 includes a permanent magnet generator 45 that has an excitation output coil assembly 44 wound on the exciter armature 47 and a permanent magnet assembly 32 located stationary next to the exciter armature. The excitation output coil assembly 44 is formed by three exciter windings 41, 42, and 43 connected in a conventional WYE orientation to produce three phases of alternating electric current upon rotating within the magnetic field produced by the permanent magnet assembly 32.

The three phases of alternating electric current produced by the permanent magnet generator 45 are applied to inputs of a three-phase bridge rectifier 48. The bridge rectifier 48 converts that alternating current into a single direct current that results in a DC voltage across supply nodes 51 and 52. A capacitor 55 is connected across the supply nodes 51 and 52. Also connected across the supply nodes is a circuit branch formed by a series connection of the field coil 46 with a field effect transistor (FET) 56. The FET 56 may be a MOSFET and depending upon the maximum current level that is switched, multiple FET's connected and controlled in parallel may be used. A controller 54 turns the FET 56 on and off to control the intensity of the magnetic field produced by the field coil 46 and thus to regulate the output voltage of the alternator 16. As will be described, the duty cycle of that on/off control determines the intensity of that magnetic field. When the FET 56 is turned on, i.e., is in a conductive state, the current flowing through the field coil 46 ramps up to some steady state DC level. Thereafter, when the FET 56 switch is turned off, i.e., is in a non-conductive state, the field coil current decays to zero through a flyback diode 57 connected in parallel with the field coil 46. For greater current handling capacity, multiple flyback diodes, connected in parallel, may be used.

The power to operate the controller 54 and the FET 56 is derived from the voltage across supply nodes 51 and 52 when the FET is non-conductive. The charge on capacitor 55 provides ride-through during short circuit conditions when the FET 56 must remain on for prolonged period of time, e.g., at least ten seconds.

The exciter 40 is controlled to vary the excitation magnetic field produced by the field coil 46, which thereby regulates the alternator output voltage to a substantially constant nominal level (e.g. 220 volts). To control the exciter 40, the output sensors 26 in FIG. 1 provide indications of the voltage magnitude of each output phase of the alternator 16. Those voltage magnitude indications are sent to the genset controller 22 which determines the magnitude of current to be supplied to the field coil 46 in order to produce an excitation magnetic field that has the desired intensity. Any of several conventional genset controllers may be utilized, such as the one described in U.S. Pat. No. 6,700,356. Alternatively, a hard-wired voltage regulator can be used, in place of the genset controller 22, to produce a signal for controlling the field coil current in response to the output voltages measured by the output sensors 26.

Figure 4:
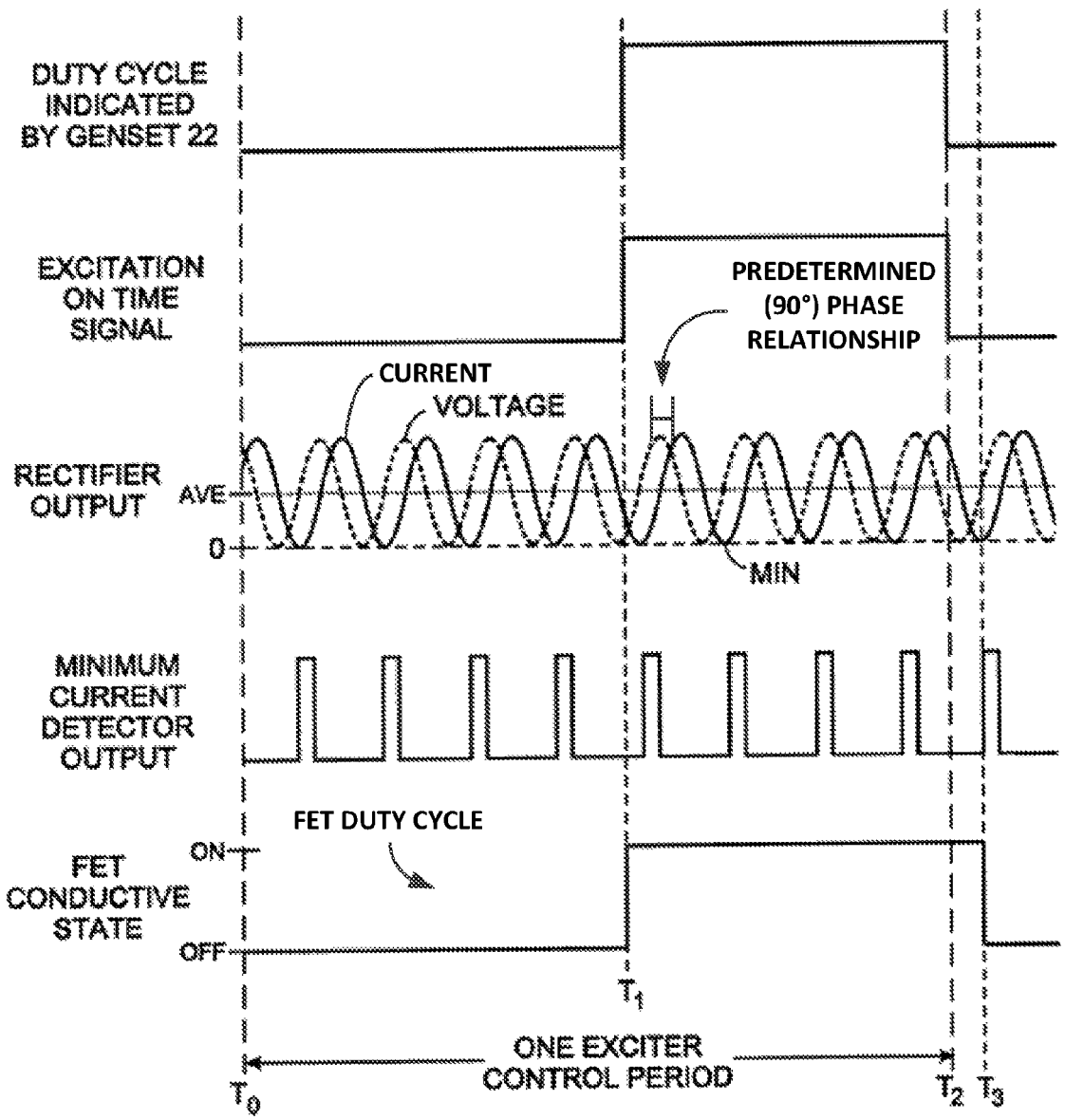
FIG. 4 is a waveform diagram of several signals produced to control excitation of the alternator.

With reference to FIG. 4, the regulation of the alternator 16 uses predefined consecutive exciter control periods (To-T2). That regulation involves controlling the magnitude of current applied to the field coil 46 by varying the duty cycle of the FET 56, i.e., by varying the amount of time during each exciter control period that the FET is conductive. For example, the continuous duty cycle for producing the full load output power level from the alternator 16 may be 50%, which means that the FET 56 is conductive for half the exciter control period.

With additional reference to FIG. 1, the genset controller 22 compares the output voltages measured by the output sensors 26 to the nominal output voltage level (e.g. 220 volts). Any deviation from the nominal level produces a error signal which is used in a conventional manner to determine how the duty cycle of the FET 56 should be changed to produce the proper magnetic field from the field coil 46, so that the nominal output voltage is generated. This duty cycle control is generally similar to that used in prior alternators. The desired duty cycle is indicated by the voltage level of an excitation control signal produced on line 28 by the genset controller 22.

Referring to FIG. 2, the excitation control signal on line 28 is applied via an optical coupler 60 to the exciter 40 on the alternator rotor 38. The optical coupler 60 has a stationary transmitter 62 and a rotating receiver 64. The excitation control signal is applied to the transmitter 62, which emits a light beam 66 that is modulated by the voltage level of the excitation control signal. The light beam 66 is directed toward the rotor 38. The receiver 64 on the rotor 38 receives the modulated light beam 66 and produces a signal that is applied to an input of the controller 54. The voltage of that receiver signal varies in response to the modulation of the light beam. Other techniques for conveying the excitation control signal to the rotating exciter 40 can be employed.

Figure 3:
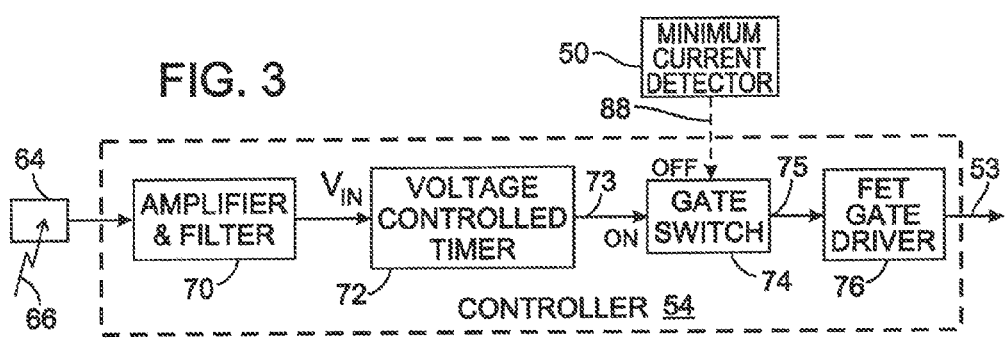
FIG. 3 is a block diagram of a controller in the alternator.

As shown in FIG. 3, the controller 54 comprises an amplifier and filter circuit 70 to which the output signal from the optical receiver 64 is applied. The amplifier and filter circuit 70 increases the intensity of that signal and filters the resultant signal to remove any spurious components due to extraneous light striking the optical receiver 64. The signal from the amplifier and filter circuit 70 is a replica of the excitation control signal produced by the genset controller 22 in which the voltage level designates the duty cycle of the FET 56 and thus magnitude of the field coil excitation that is desired. That replica signal is applied to the input VIN of a voltage controlled timer 72. The voltage controlled timer 72 responds by turning on for a timing period (ON) that has a duration equal to the voltage level of the replica signal times a constant increment of time X, i.e., ON=X*YIN. The voltage controlled timer 72 produces an output signal, referred to as the "Excitation ON Time Signal," on line 73 that during the timing period has a true logic level (e.g. a high logic level), as depicted in FIG. 4. The Excitation ON Time Signal corresponds to the duty cycle indicated by the excitation control signal from the genset controller 22.

Conventional excitation control techniques would simply turn the FET 56 on and off in response to the level of the Excitation ON Time Signal without regard for the magnitude of current flowing through the FET. The present applicant discovered, however, that when the FET 56 switches off, a high transient voltage spike often was produced across the supply nodes 51 and 52 as a result of the inductance of the excitation output coil assembly 44 of the permanent magnet generator 45 and the magnitude of current flowing at that time. Because the permanent magnet generator 45 is attached to the three-phase bridge rectifier 48, transients on the excitation output coil assembly 44 that had a negative polarity were rectified and added to the combined DC bus voltage immediately. Such high transient voltage spikes can damage the FET and thus are undesirable.

It has been determined that these high switching transients can be minimized or eliminated if the off transition of the FET 56 occurs when the DC current through the FET is zero, or at least the minimum level that is occurring. Even if the current through the FET never becomes zero, a significant reduction of the switching transient effects can be achieved when the off transition of the FET 56 occurs when the current is at a minimum. This, however, requires a sensor to detect that current condition.

The capacitor 55 has a selected capacitance that, when combined with the inductance of the excitation output coil assembly 44 of the permanent magnet generator 45 and the circuit resistance, forms a resonant circuit. The resonant frequency of this circuit is either the fundamental frequency of the alternating current produced by the excitation output coil assembly or a harmonic of that fundamental frequency. The resonance results in cyclically varying (e.g. oscillating) current and voltage DC waveforms occurring at the output of the three-phase bridge rectifier 48, as depicted in FIG. 4. The resonance configured so that the voltage across supply nodes 51 and 52 leads the current through the FET 56 by 90 degrees. Although a 90 degree phase relationship between the voltage and current is employed in the exemplary embodiment of the exciter 40, other phase relationship may be used.

Figure 5:
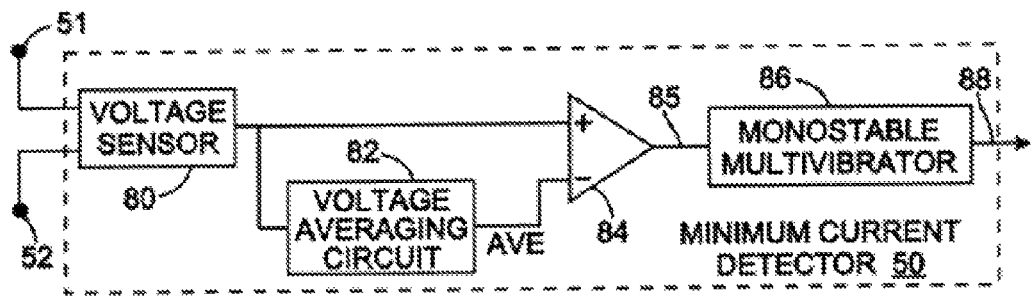
FIG. 5 is a block diagram of a minimum current detector in the alternator.

The control of the exciter 40 utilizes a minimum current detector 50 that detects when the minimum level of current flows through the FET in the conductive state. That minimum current level occurs and the lowest point (MIN) in each current cycle, which may point may correspond to zero current. In the block schematic diagram of an exemplary minimum current detector 50 in FIG. 5, a voltage sensor 80 senses the DC voltage across supply nodes 51 and 52 and emits a signal denoting that voltage.

That signal is applied to a voltage averaging circuit 82 that produces a running average voltage level (AVE) where the averaging time interval is at least one period of that oscillating DC voltage. The resultant average voltage level indicates the mid level between the maximum and minimum voltages that occur during the oscillation cycles. The average voltage level (AVE) is applied to the inverting input of a comparator 84 that has a non-inverting input to which the voltage level from the voltage sensor 80 is directly applied. The output of the comparator 84 on line 85 has a low logic level when the supply node voltage is less than the average voltage and has a high logic level when the supply node voltage is greater than the average voltage.

When the oscillating DC voltage across supply nodes 51 and 52 makes a low to high transition through that average voltage level, such as occurs at time T 3 in FIG. 4, the current is at the minimum level due to the 90 degree phase relationship between the voltage and the current. That voltage transition across the average voltage level causes the output of the comparator 84 on line 85 to go from a low logic level to a high, or true, logic level. Then by detecting a low to high transition (a rising edge) of the comparison result, the times at which the minimum current levels occur can be detected. The signal produced by the comparator 84 is applied to the trigger input of a monostable multivibrator 86 that responds to a rising edge in that signal by emitting a brief true logic level pulse on the output line 88 of the minimum current detector 50 as depicted in FIG. 4. Thus detection of a minimum current level causes the minimum current detector 50 to apply a tme logic level pulse to the OFF input of a gate switch 74.

Referring again to FIGS. 2 and 3, the gate switch 74 also has an ON input that receives the Excitation ON Time Signal produced by the voltage controlled timer 72. The gate switch 74 responds to receiving a true logic level at the ON input by producing a true logic level at its output 75. The output of the gate switch 74 remains true for as long as the ON input receives a true logic level and for a time thereafter until a tme logic level is received at the OFF input. The output 75 of the gate switch 74 is applied to a gate driver 76 that produces a signal on line 53 which is applied to the gate of the FET 56 to control the conductive state of that latter component.

When the Excitation ON Time Signal goes true, the gate switch produces a true logic level at its output line 73 that causes the FET 56 to turn on at time $T^1$, as shown in the bottom waveform in FIG. 4. In the conductive state of the FET 56, DC current from the three-phase bridge rectifier 48 is fed through the field coil 46. Thereafter, when the Excitation ON Time Signal goes false, at the end of the exciter control period at time T 2, the output on the gate switch 74 remains true, until the next true logic level pulse from the minimum current detector 50 is received at the OFF input. At that time T 3 in FIG. 4, the output of the gate switch 74 goes false, thereby turning off the FET 56. Note that at time T 3 the current flowing through the FET 56 is at a minimum level.

When the FET is conductive, output current from the three phase bridge rectifier 48 is sent through the field coil 46 which produces a magnetic field that induces current in the alternator output coil assembly 34. When the FET 56 turns off, the decaying magnetic field from the field coil 46 produces a current that flows through the flyback diode 57. Because of the switching frequency of the FET 56 that is set by the length of the exciter control period, current continues to flow through the field coil 46 even while the FET 56 is non-conductive. The magnitude of that current is controlled by the duty cycle of the FET 56, which in turn in determined by the signal on line 28 from the voltage regulator in the genset controller 22.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A system for exciting a field coil of an alternator in order to produce a magnetic field that induces electricity in an alternator output coil assembly, the system comprising:
   a generator that has an excitation output coil assembly for producing alternating electricity;
   a rectifier having an input coupled to the excitation output coil assembly and an output, converting the alternating electricity into a direct current with an output voltage, and providing the direct current at the output;
   a capacitor connected to the output of the rectifier and having a capacitance that forms a resonant circuit with inductance of the excitation output coil assembly, wherein the resonant circuit causes the output voltage and direct current to vary cyclically;
   a switch connected in series with the field coil, the switch being operable to control application of the direct current to the field coil;
   a minimum current detector coupled to the output of the rectifier and operable to determine when the magnitude of the direct current is at a minimum level and in response thereto producing an indication; and
   a controller coupled to a control terminal of the switch and an output of the minimum current detector, the controller,
      in response to an excitation control signal, places the switch in a conductive state in which the direct current is applied to the field coil, and,
      in response to the indication received from the output of the minimum current detector, places the switch in a non-conductive state.

2. The system as recited in claim 1 wherein the resonant circuit has a resonant frequency equal to a fundamental frequency of the alternating electricity or a harmonic of the fundamental frequency.

3. The system as recited in claim 1 further comprising a flyback diode connected in parallel with the field coil.

4. The system as recited in claim 1 wherein the output voltage and the direct current are across terminals of the capacitor and have a predefined phase relationship in which the output voltage leads the direct current.

5. The system as recited in claim 1 wherein the output voltage and the direct current are across terminals of the capacitor and have a predefined phase relationship in which the output voltage leads the direct current by ninety degrees.

6. The system as recited in claim 1 wherein the minimum current detector includes a voltage sensor to detect a voltage level of the output voltage.

7. The system as recited in claim 1 wherein the minimum current detector includes
   a voltage averaging circuit that averages the output voltage to produce an average voltage level, and
   a comparator, wherein the comparator determines when the direct current has a minimum level in response to the output voltage having a predefined relationship to the average voltage level.

8. The system as recited in claim 7 wherein the comparator has
   a first input coupled to a voltage sensor and
   a second input coupled to the voltage averaging circuit,
   wherein the comparator provides a minimum current signal when the output voltage makes a transition across the average voltage level.

9. The system as recited in claim 7 wherein the comparator has
   a first input coupled to a voltage sensor and
   a second input coupled to the voltage averaging circuit,
   wherein the comparator provides a minimum current signal when the output voltage goes from being less than the average voltage level to being greater than the average voltage level.

10. The system as recited in claim 1 wherein the controller includes:
    an excitation control signal input that receives the excitation control signal, wherein the excitation control signal denotes a duty cycle for operation of the switch;
    a gate switch coupled to the output of the minimum current detector;
    conditioning elements coupled between the excitation control signal input and the gate switch; and
    a gate driver coupled between an output of the gate switch and the control terminal of the switch.

11. The system as recited in claim 1 wherein the switch is a field effect transistor.

* * * * *